(12) United States Patent
Conlan et al.

(10) Patent No.: US 9,710,247 B2
(45) Date of Patent: Jul. 18, 2017

(54) IDENTIFICATION OF HOST-COMPATIBLE DOWNLOADABLE APPLICATIONS

(75) Inventors: Patrick Michael Conlan, Seattle, WA (US); Rolando Jimenez-Salgado, Redmond, WA (US); Juan Gabriel Balmori Labra, Redmond, WA (US); Todd Haugen, Clyde Hill, WA (US); Brian Michael Jones, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/533,367

(22) Filed: Jun. 26, 2012

(65) Prior Publication Data

US 2013/0346965 A1 Dec. 26, 2013

(51) Int. Cl.
G06F 9/44 (2006.01)
G06F 9/445 (2006.01)
G06Q 30/06 (2012.01)

(52) U.S. Cl.
CPC ............ *G06F 8/61* (2013.01); *G06F 9/44526* (2013.01); *G06Q 30/0601* (2013.01); *G06F 8/60* (2013.01)

(58) Field of Classification Search
None
See application file for complete search history.

(56) References Cited

U.S. PATENT DOCUMENTS 6,151,643 A 11/2000 Cheng et al.
7,158,997 B2 1/2007 Blinn et al.
7,752,313 B2 7/2010 Adelman et al.
7,779,034 B2 8/2010 Pedersen et al.
(Continued)

FOREIGN PATENT DOCUMENTS

CN 101382894 3/2009
CN 101799765 8/2010
(Continued)

OTHER PUBLICATIONS

Lawton, George, "Developing Software Online with Platform-as-a-Service Technology", Jun. 2008, Retrieved at <<http://ieeexplore.ieee.org/stamp/stamp.jsp?tp=&arnumber=4548165>>, Computer, IEEE Computer Society, pp. 13-15.
(Continued)

*Primary Examiner* — Brian W Wathen
(74) *Attorney, Agent, or Firm* — Lee & Hayes, PLLC; Charles L. Warner

(57) ABSTRACT

A user's (client) computer sends a request for a listing of applications which can be downloaded from a server in an electronic marketplace and a list of functions provided by a host program. A description of an application, such as in an application manifest, provides a list of required functions and, preferably, a list of optional functions for a software application. The server sends a list of applications supported by those functions. Those supported applications are displayed to the user as being available for downloading. The user selects the desired application and the user's computer requests, and the server provides, a download of that application. The downloaded application will then operate on the user's computer using the required functions provided by the host programs, and may use any optional functions provided by the host programs.

19 Claims, 7 Drawing Sheets

(56) References Cited

U.S. PATENT DOCUMENTS

| | | | |
|---|---|---|---|
| 7,788,388 B2 | 8/2010 | Piersol | |
| 7,861,178 B2 | 12/2010 | Lui et al. | |
| 7,913,248 B1* | 3/2011 | Lynch et al. | 717/174 |
| 8,126,959 B2 | 2/2012 | Paul et al. | |
| 2007/0245409 A1 | 10/2007 | Harris et al. | |
| 2008/0134162 A1* | 6/2008 | James | G06F 9/44526 717/168 |
| 2009/0037287 A1* | 2/2009 | Baitalmal | G06Q 30/0641 705/27.1 |
| 2009/0292545 A1 | 11/2009 | Mohammed et al. | |
| 2011/0023109 A1 | 1/2011 | Aaron et al. | |
| 2011/0029881 A1* | 2/2011 | Smith | G06F 8/60 715/735 |
| 2011/0126168 A1 | 5/2011 | Ilyayev | |
| 2012/0089974 A1* | 4/2012 | Cho | G06F 8/61 717/173 |
| 2012/0096435 A1* | 4/2012 | Manolescu | G06Q 30/02 717/121 |
| 2012/0102485 A1* | 4/2012 | Goldman | G06F 8/64 717/176 |
| 2013/0024851 A1* | 1/2013 | Firman | G06F 8/60 717/170 |
| 2013/0232229 A1* | 9/2013 | Firman | G06F 8/61 709/219 |

FOREIGN PATENT DOCUMENTS

| | | |
|---|---|---|
| CN | 102063299 | 5/2011 |
| CN | 102129380 | 7/2011 |
| CN | 102143222 | 8/2011 |
| EP | 2224336 | 9/2010 |
| JP | 2010015533 | 1/2010 |
| JP | 2010182309 | 8/2010 |
| KR | 10-2012-0043382 A | 5/2012 |
| RU | 2453911 | 6/2012 |
| WO | WO2008013577 | 1/2008 |
| WO | WO2010129135 | 11/2010 |

OTHER PUBLICATIONS

Tamm, et al., "On-Demand Application Integration Business Concepts and Strategies for the ASP Market", Dec. 1, 1999, Retrieved at <<http://citeseerx.ist.psu.edu/viewdoc/download?doi=10.1.1.41.3380&rep=rep1&type=pdf>>, In Proceedings of Federated Databases(Berlin), pp. 158-171.

International Search Report & Written Opinion dated Jun. 27, 2014 in PCT Application No. PCT/US2013/046672.

"Chrome.experimental.*APIs, List of APIs"; https://developer.chrome.com/apps/experimental' 2 pages.

"Declare Permissions"; https://developer.chrome.com/apps/declar_permissions; 5 pages.

"JavaScript APIs" https://developer.chrome.com/apps/api_index, 8 pages.

"Web APIs"; https://developer.chrome.com/apps/api_other; 3 pages.

Extended European Search Report mailed Dec. 23, 2105 for European patent application No. 13739538.0, 6 pages.

App Compatibility with Android; 2 pages; https://support.google.com/googleplay/answer/2851648?hl=en-IN.

Compatibility Program Overview, 2 pages; http://source.android.com/compatibility/overview.html.

Filters on Google Play, http://developer.android.com/google/play/filters.html, 10 pages.

How to Indicate What Devices Are Supported by Your iOS App, dated May 2, 2012; 6 pages; http://blog.manbolo.com/2012/05/02/how-to-indicate-what-devices-are-supported-by-your-ios-app.

In-App Billing Version Notes, Android Developers, 3 pages; http://developer.android.com/google/play/billing/versions.html.

In-App Purchase; 2 pages; http://www.webopedia.com/TERM/I/in-app_purchase.html.

Introducing Google Play: All your entertainment, anywhere you go; dated Mar. 6, 2012, 9 pages; https://googleblog.blogspot.in/2012/03/introducing-google-play-all-your.html.

iOS Device Compatibility Reference, 10 pages; https://developer.apple.com/library/ios/documentation/ DeviceInformation/Reference/iOSDeviceCompatibility/DeviceCompatibilityMatrix/DeviceCompatibilityMatrix.html.

iPhone App Store Has Launched (Updated); dated Jul. 10, 2008; 5 pages; http://techcrunch.com/2008/07/10/app-store-launches-upgrade-itunes-now/.

"On Android Compatibility", 22 page,s dated May 31, 2010, http://android-developers.blogspot.in/2010_05_01_archive.html.

Supporting Different Platform Versions; 4 pages; http://developer.android.com/training/basics/supporting-devices/platforms.html.

"The Chrome Web Store", dated May 19, 2010, 6 pages; http://blog.chromium.org/2010/05/chrome-web-store.html.

Android Developers Blog, "The Five Steps to Future Hardware Happiness", dated Oct. 11, 2010, 3 pages;http://android-developers.blogspot.in/2010/10/five-steps-to-future-hardware-happiness.html.

Mexican Office Action mailed May 27, 2016 for Mexican Patent Application No. MX/a/2014/015929, a counterpart foreign application of U.S. Appl. No. 13/533,367, 3 pages, including a translated summary of one section thereof.

Chinese Office Action mailed Nov. 14, 2016 for Chinese Patent Application No. 201380033820.4, a counterpart foreign application of U.S. Appl. No. 13/533,367, 13 pages.

Japanese Office Action mailed Jan. 23, 2017 for Japanese Patent Application No. 2015-520302, a counterpart foreign application of U.S. Appl. No. 13/533,367, 5 pages.

Mexican Office Action mailed Jan. 10, 2017 for Mexican patent application No. MX/a/2014/015929, a counterpart foreign application of U.S. Appl. No. 13/533,367, 4 pages.

Russian Office Action mailed Feb. 22, 2017 for Russian patent application No. 2014152999, a counterpart foreign application of U.S. Appl. No. 13/533,367.

* cited by examiner

IDENTIFICATION OF HOST-COMPATIBLE DOWNLOADABLE APPLICATIONS

BACKGROUND

In an electronic marketplace, a user may purchase and/or acquire the right to download and activate one or more applications. These applications typically specify a specific host platform or a specific program on a host platform. If the applications are supported by programs on the user's computer then the user's experience with the marketplace will be positive. If, however, the applications are not supported and will not run on the user's computer, then the user will regard his or her experience as being unsatisfactory. This is particularly true as there are few, if any, refunds available once an application has been purchased or downloaded. The user's experience, therefore, is better if an application listed for downloading will, in fact, run on the user's computer.

SUMMARY

A description of an application, such as may be added to an application manifest, but not necessarily limited to an application manifest, provides at least a listing of functions which are required in order for the application to provide desired features to a host program on a host/client computer. If the required functions for an application are available on the client computer then the application will be displayed to a user as being available, and therefore downloadable, from a server in an electronic marketplace. If a displayed application is selected, downloaded to, and activated on, the user's computer, the application will interface with the client computer to provide the desired features by using the functions provided by the host programs.

In addition, optional functions may be listed which will provide for enhanced features in the application. If the host program provides one or more of the optional functions then the application can operate in an enhanced mode.

It should be appreciated that the subject matter described herein may be implemented as a computer-controlled apparatus, a computer process, a computing system, or as an article of manufacture such as a computer-readable storage medium. These and various other features will be apparent from a reading of the following Detailed Description and a review of the associated drawing.

This Summary is a brief and/or simplified introduction to some of the concepts that are described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
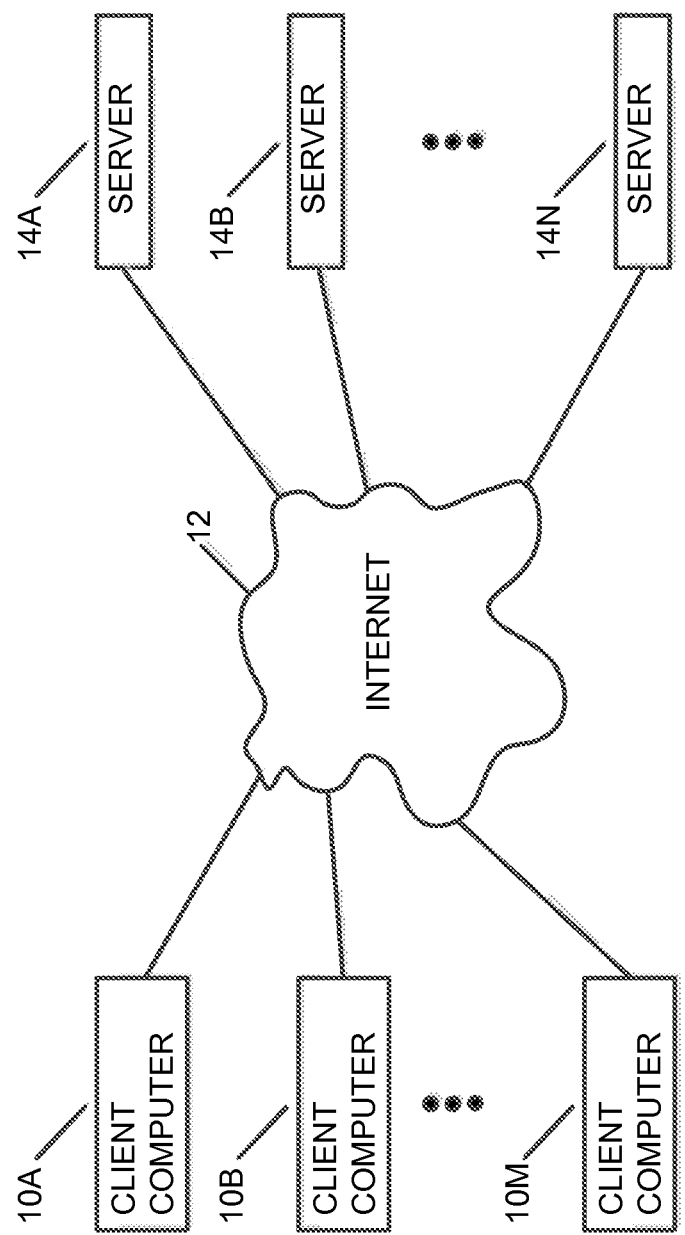
FIG. 1 illustrates an exemplary environment wherein one or more user (client, or destination) computers are connected via a communications medium, such as the Internet, to one or more servers in an electronic marketplace.

The following detailed description is directed to concepts and technologies for identification of host-compatible download programs. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawing, in which like numerals represent like elements throughout the several figures, aspects of a computing system, computer-readable storage medium, and computer-implemented methodology for identification of host-compatible download programs will be presented.

FIG. 1 illustrates an exemplary environment wherein one or more user (client, or destination) computers 10A-10M are connected via a communications medium 12 to one or more servers 14A-14N in an electronic marketplace, where M and N are both integers greater than zero. A client computer 10 may be any type of computing platform, for example, a personal computer, a business computer, a tablet, or another type of computing device that hosts one or more programs. The communications medium 12 may be, for example, the Internet, a Wi-Fi® connection, or some other communications medium which is capable of transferring data, including software applications, from one point to another. Finally, a server 14 is also a type of computing device but, in this case, has software application programs stored on it or readily retrievable by it.

In an electronic marketplace, a user at a client computer 10, for example, 10A, may be searching for a software application to fill a particular need, or just to see what may be available, either for free or for purchase. If the software application will not interface properly with the user's computer 10A, then the user's experience with the electronic marketplace and/or with the company running that particular server will be unpleasant, particularly so if the user has paid for the application and cannot obtain a refund. The user's experience will, however, be regarded as pleasant if the application interfaces properly.

It will be appreciated that the terms "program", "application", "app", "extension", "module", "data link library"

(dll), and "plug-in" are commonly-used, but do not have standardized and unambiguous meanings, and the common use of those terms often blurs the distinction between those terms. For example, "program", "application", and "app" are often used interchangeably, and "application", "app", "extension", "module", "dll", and "plug-in" are also often used interchangeably. Therefore, for convenience of discussion, and not as a limitation or a definition, a "program" and a "host program", as generally used herein, are a productivity program (productivity software), such as but not limited to, a word processing program, a spreadsheet program, a graphics program, an email program, etc., which has executable code. Also for convenience of discussion, and not as a limitation or a definition, an "application" and a "software application", as generally used herein, are a module, extension, dll, or plug-in, and also has executable code, such as, and including, but not limited to, for example, Javascript®. In the environment described herein, a "program" is typically located in a user's computer, also called a host, client or destination computer, and an application typically is located on, and is available for downloading from, a server for use with a program on the user's computer.

An application manifest is a description of how an application will integrate with productivity software. One conventional example of the format of an application manifest is an XML file that defines the structure and content of an application, including how the application integrates with the productivity software. Conventional application manifests typically, but not necessarily, have both required elements and optional elements. Required elements may be, for example and not as a limitation, assembly, manifest version, and assemblyIdentity. Optional elements may be, for example and not as a limitation, noInherit, compatibility, application, supportedOS, dependency, dependentAssembly, and file. Other application manifest formats are also possible and the use of other formats is specifically included and contemplated herein.

A conventional application manifest is therefore tied to and targets one or more specific programs on the host computer. If, however, the host program changes or new host programs become available then the application manifest becomes outdated and the developer of the application would need to update the application manifest to reflect those changed and/or new host programs or the application may not run, or may not run properly with the host program. For example, it is a conventional practice that when a developer requires a specific feature or capability in a host program for an application that the developer is creating, then the developer will test the application using host programs that provide that feature or capability, and then list those host programs on the application manifest.

Also, conventionally, if a user has a host program, such as a word-processing program, and the user wants an additional capability for a particular project or purpose, the user will click on a menu, toolbar, "ribbon" or other user interface in the host program. This will bring up a dialog box whereby the user can submit search criteria for an available application to a marketplace server, and the marketplace server will return a listing of applications which meet the search criteria. The user can then select an application for downloading from the server. If, however, the manifest for the application lists a host program required for the application to operate, such as Microsoft® Excel®, and that host program is not available on the user's computer, then the selected application will not interface properly with the host program on the client computer.

To address this situation, the present application manifest is modified to specify a function which is required, rather than just a specific host program. Thus, when new host programs become available which describe, in their manifests or in other documents, that they provide the specific function, or a host program is modified or updated to add or update (or even to delete) the function and the program manifest is updated accordingly, the developer need not update the application manifest. Rather, the listing of compatible host programs is automatically expanded when a host program becomes available which provides that function, and automatically contracted when a host program no longer provides that function. Further, preferably but not necessarily, applications are not listed as available if the user's computer does not have a host program which can provide the function(s) required by the application. Also, preferably, but not necessarily, optional functions may be listed in the manifest which will provide for enhanced features in the application. If the host program provides one or more of the optional functions then the application can operate in an enhanced mode. In an alternative embodiment, the required functions and/or the optional functions are listed in a document provided separately from the application manifest.

Figure 2A:
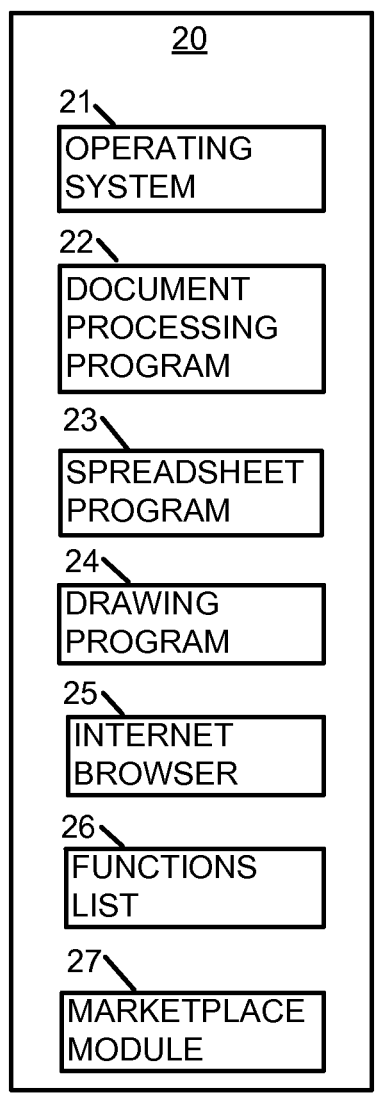
FIG. 2A illustrates an exemplary operating environment of a client computer.

FIG. 2A illustrates an exemplary operating environment of a client computer 10, such as client computer 10A. A client computer 10 has one or more host programs 20 on it, such as an operating system 21, a document processing program 22, a spreadsheet program 23, a drawing program 24, an Internet browser 25, etc. The computer 10 also has a list 26 of functions provided by the various host programs, and an electronic marketplace program or module 27 for performing the operations listed herein.

Figure 2B:
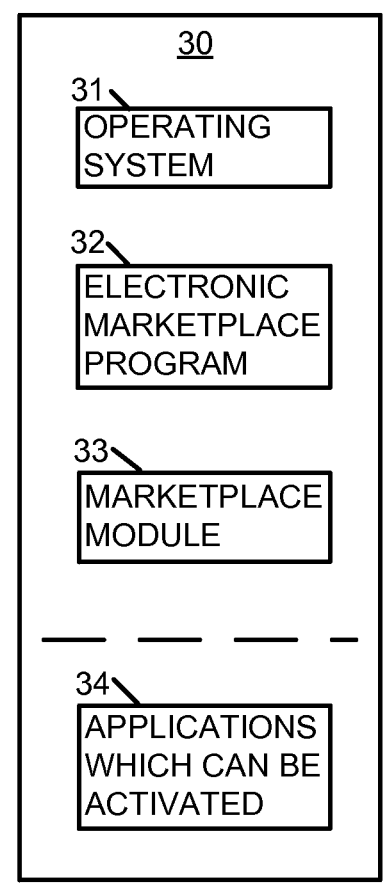
FIG. 2B illustrates an exemplary operating environment of a server.

FIG. 2B illustrates an exemplary operating environment of a server 14, such as electronic marketplace server 14A. A server 14 has one or more host programs 30 on it, such as an operating system 31, an electronic marketplace program 32, and a program or module 33 for performing the operations listed herein. In addition, the server 14 has, or has access to, or one or more applications 34 which are available for downloading.

Figure 3:
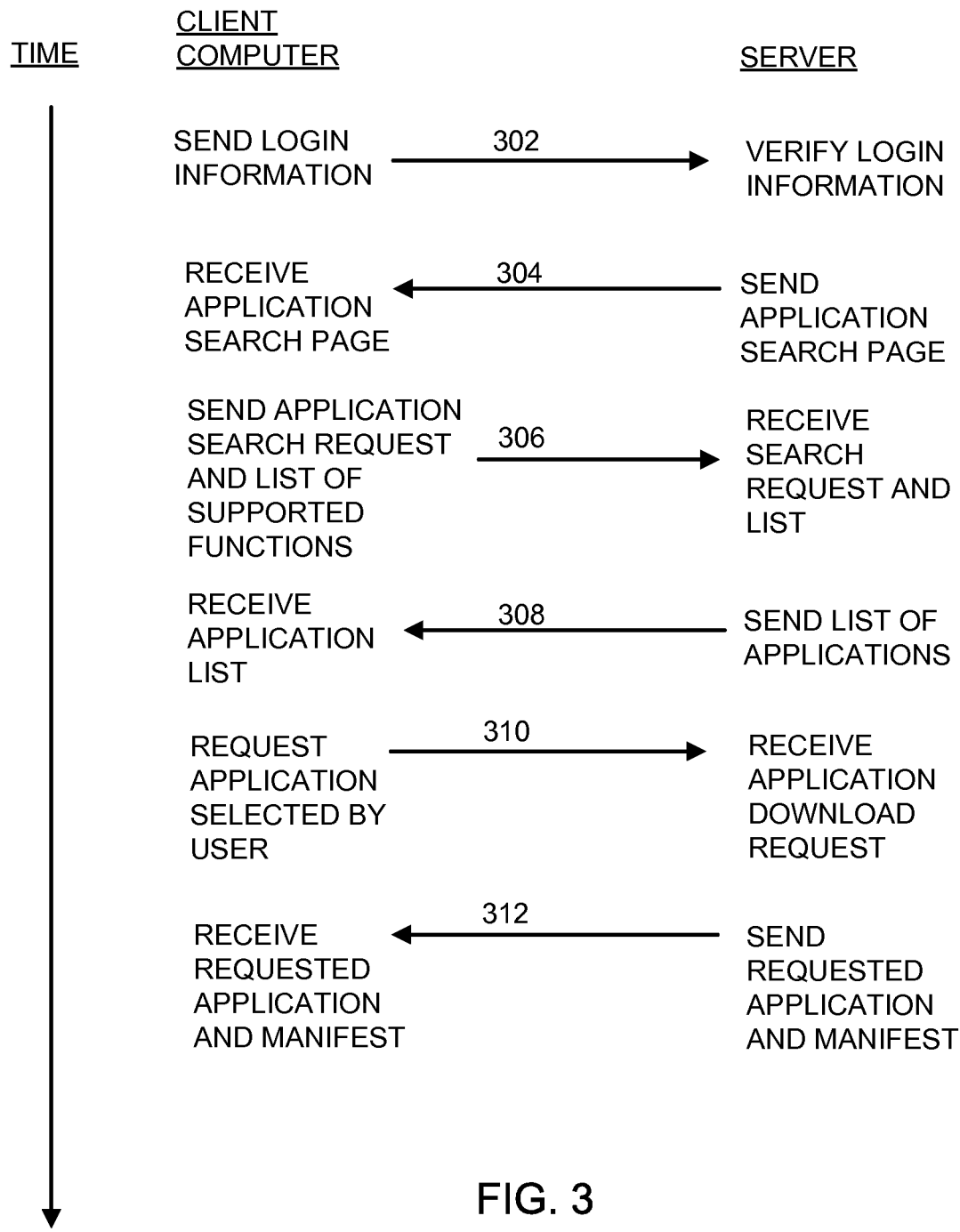
FIG. 3 illustrates an exemplary operational timeline for communications between a client computer and a marketplace server.

FIG. 3 illustrates an exemplary operational timeline 300 for communications between a client computer 10 and a marketplace server 14. Assume that the user is using a host program, such as a word-processing program, and the user wants an additional feature or capability, which is not provided for by that program, for a particular project or purpose. The user will click on a menu, toolbar, "ribbon", or other user interface in the host program. This will bring up a dialog box whereby the user can submit search criteria for an available application to a marketplace server. The dialog box can also include other options or recommendations such as, but not limited to, "most used by others", "featured applications", "applications rated most highly by other users", etc. After going to the electronic marketplace web site and receiving a login page, the client computer sends 302 the login information to the server and the server verifies the login information. The login procedure is optional, but is preferred.

The server then sends 304 a search page or a drop-down menu or other user interface technique to the client computer, whereby the user can indicate the type of application that the user is wanting, such as, but not limited to, "map", "package tracking", "restaurant locator", Also, if not previously listed in the dialog box mentioned above, other options or recommendations can be provided at this point, such as, but not limited to, "recommended applications", "most often downloaded applications", "applications rated most highly by other users", etc. The client computer will display that search page to the user and accept the user's search request. The client computer then sends 306 the application search request to the server, preferably but not necessarily along with a listing of the functions or capabilities that are supported by the host program.

The server then searches its listing of applications to identify those which meet the search request. The server also inspects the manifests of those identified applications to compare their respective required functions with the functions supported by the host program. The server then generates and sends 308 to the client computer a list of compatible applications, that is, those identified, supported applications. The client computer receives 308 and then displays a list of these compatible applications to the user, and then accepts the user's selection of a displayed compatible application. The user may select the desired application in any convenient manner, such as but not limited to checking a block associated with the desired application and then clicking "send", "buy", "acquire", double-clicking on the listed application, or by some other appropriate action (including, but not limited to, voice commands and gesture commands). The client computer then sends 310 to the server a request for the particular application selected by the user.

In response, the server sends and the client computer receives and stores 312 the requested application and the manifest therefor. The application manifest, as modified herein, may also include the address of the selected application on the server or some other information which can be used to identify the application. The client computer receives and stores the application and its manifest.

In an alternative implementation, the addresses of the listed applications on the server or some other identifying information may be sent at 308 along with the application list. The address or other information could be included, for example, as part of the application manifest, or could be sent as a separate document. The client computer could then, at 310, send the address or other identifying information of the requested application.

Consider now, for example, a user who wishes to create a specialized report, such as an industry forecast or a financial report, but assume that the host program on the user's computer is not convenient for creating that report because, for example, the host program does not perform certain necessary mathematical operations such as adding, subtracting, averaging, etc. The user may look for an application which will conveniently create that report. Assume that the user locates such an application, but the application requires the data input to be in the form of a table, and/or provides the output report or data in the form of a table. If the host program does not support a table function then the application is not compatible with the host program. Conversely, if the host program does provide a table function, then the application will be compatible with the host program and the user will be able to create the desired report. Thus, a table function may be considered to be a required function for the application to operate in a basic mode. Once the application has been downloaded, then the host program will automatically activate the downloaded application within the host program to provide the features necessary to create the specialized report. Further, at a future time, when the user runs the host program, the host program will automatically activate the downloaded application within the host program. Thus, once the application is downloaded, the features of the application are available within the host program to the user without having to download the application again. Of course, in alternative implementations, the user may be required to pay for each use of the application, or the application may expire after a predetermined number of uses, or the application may expire after a predetermined date, etc.

Assume now that the application has the capability to provide the output report or data in different colors, such as some data being red to indicate a loss, some data being in black to indicate profitability, some data being in yellow to indicate marginal product lines, etc. The application will operate even if the host program does not support colors in the table, although the appearance of the report may be rather plain and uninteresting, and the output data will be indicated by another technique, such as the use of minus or plus signs, parentheses, brackets, etc. If, however, the host program does support colors in the table, then the enhanced or optional color features of the application are automatically available in the host program to provide a report which gets the attention of the audience.

Figure 4A:
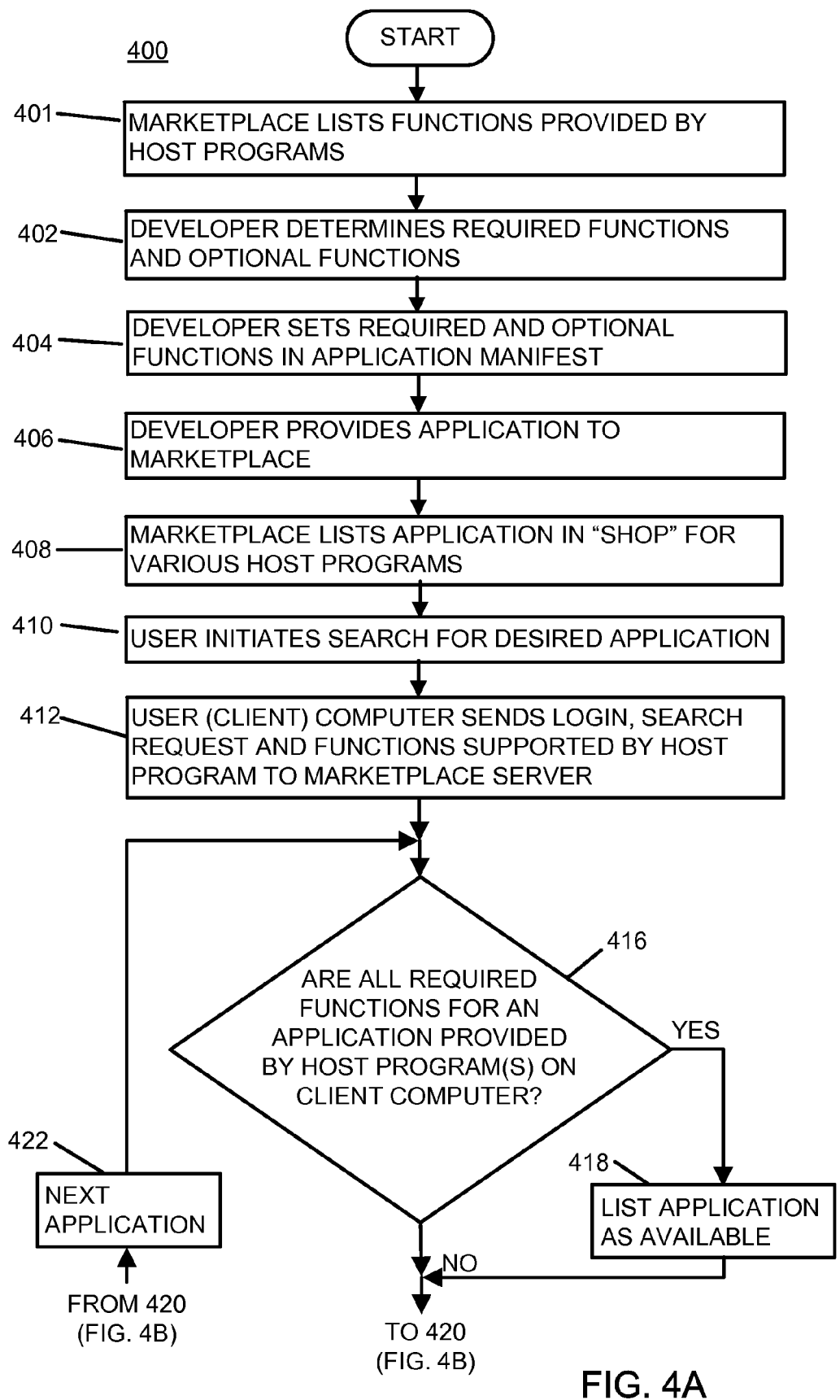
FIGS. 4A-4C are a flowchart of an exemplary procedure illustrating the operation of a client computer and a marketplace server.
Figure 4B:
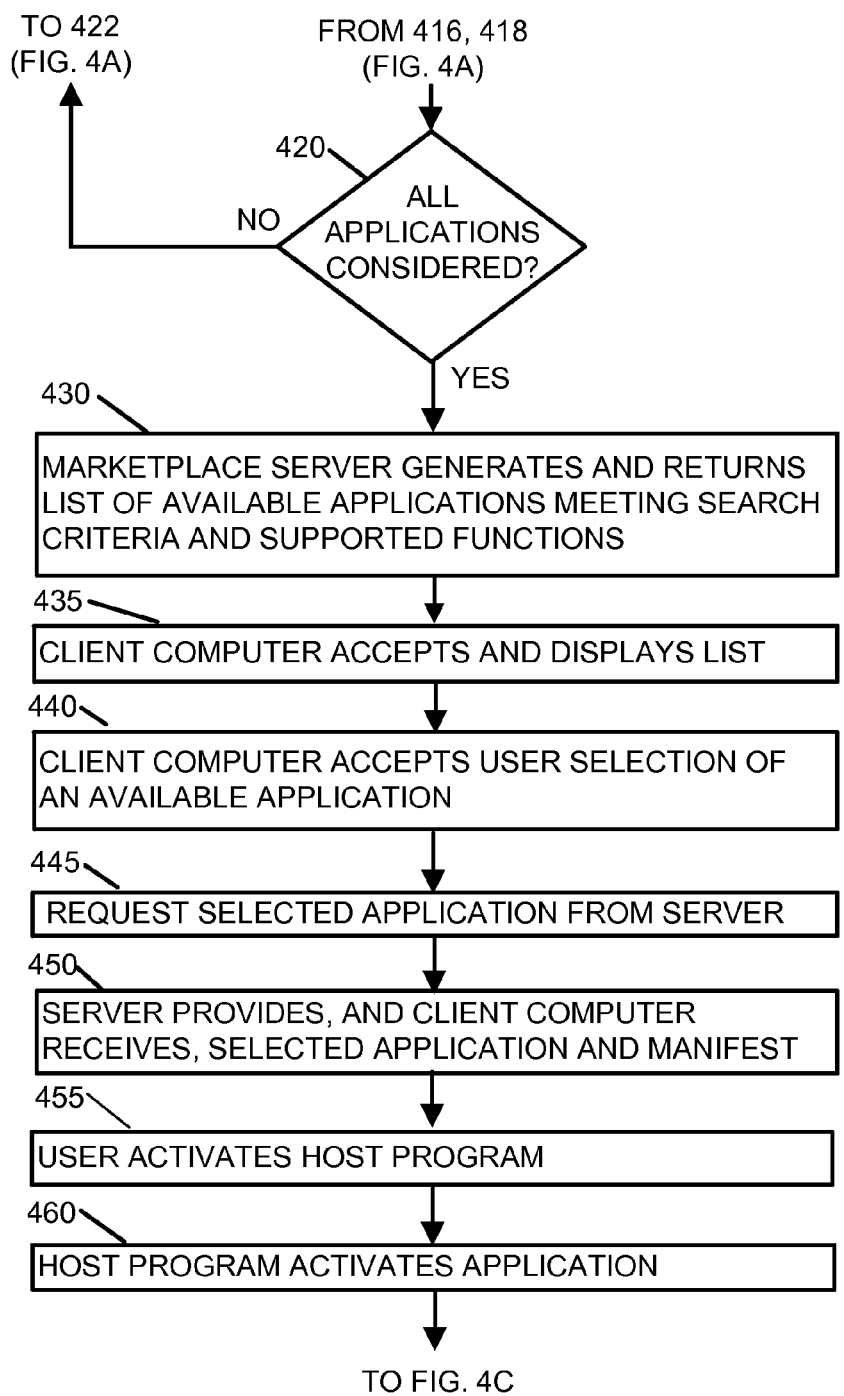
Figure 4C:
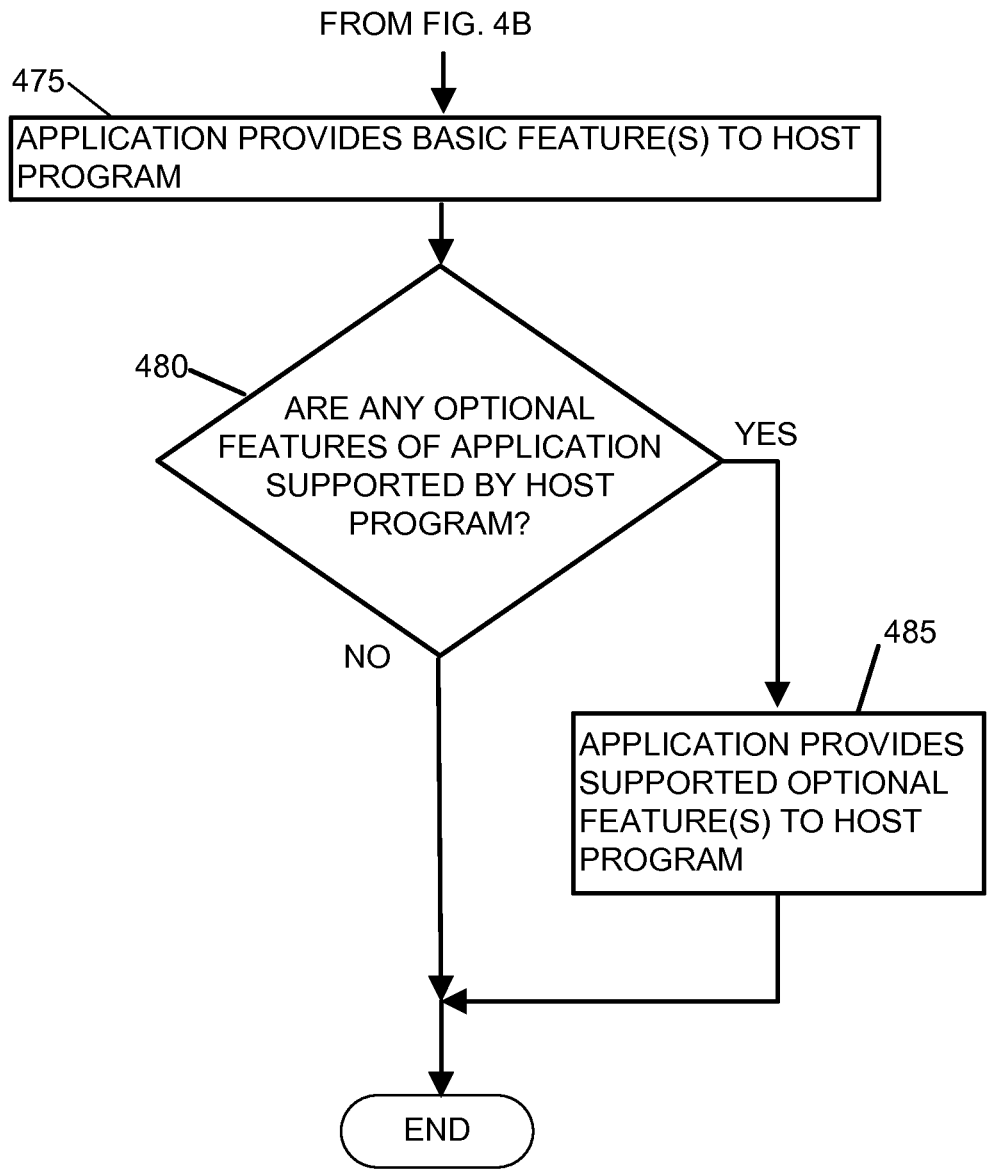

FIGS. 4A-4C are a flowchart of an exemplary procedure 400 illustrating the operation of a client computer 10 and a marketplace server 14. It should be understood that the operations of the procedure 400 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated procedure 400 can be ended at any time and need not be performed in its entirety. Some or all operations of the procedure 400, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The procedure 400 begins at operation 401, where an electronic marketplace, such as may be provided by a server 14, or a library for software developers, or some other source or provider, lists functions which are provided by various host programs. At operation 402, the application developer determines what functionalities are required in order for the application to perform at all, and what functionalities are desired (optional) in order to obtain more and/or enhanced features from the application. This may occur when the application developer is developing the application. For example, the developer may determine that the application being created may require a text function, and that being able to select various fonts, font sizes, underlining, bolding, etc. is desirable, but is not a requirement. Thus, a text function would be a required function, and a text formatting function would be an optional function. At operation 404, the developer then lists the required functions and the optional functions in the application manifest. At operation 406, the developer provides the developed application to the marketplace. The electronic marketplace then lists the application in the "shop" option for the various host programs at operation 408S.

If a user wants a particular feature or capability for some project or purpose, but that feature is not provided by the host program that the user is using, the user will click on a menu, toolbar, "ribbon" or other user interface in the host program to go to 410 the electronic marketplace to obtain that feature. The user provides login information and, at operation 412, the user's computer (preferably, but optionally) logs in to the electronic marketplace to initiate a search for an application providing the desired feature(s). The user's computer (the client or "host" computer) sends the search request and criteria to the electronic marketplace and also sends a list of the functions supported by the host program.

The server, such as but not limited to a web server, for the electronic marketplace then determines which applications are most likely to meet the user's requirements and provides 408 a list of those applications to the client computer. The server also either sends the manifest for each application or sends 408 a list of the required functions for each application. The client computer receives 409 that information and then retrieves a list of functions which are provided by the host program(s) on the client computer. The server then determines 416, 418, 420, 422 which applications are supported by the host program. The server then returns 430 a list of applications which meet the search criteria and the manifest or other identifying information for each application in the list. The server may also send price information, information on any trial period, etc. The user's computer accepts 435 that list and that information, if any, and then presents that list and any such additional information to the user.

The user makes a selection of an available application and the user's computer accepts 440 that selection and then requests 445 that application from the server by specifying the address of the application, as indicated in the manifest for that application or using other identifying information for that application. Any necessary "buy", "register", "acquire", etc. transactions are also executed. The server provides 450, and the user's computer receives 450, the manifest for the selected application and the manifest and/or other documents therefor.

Once the manifest has been received, the client computer may immediately resume the host program so that the user may begin using the desired features of the application. Also, if the user has previously acquired rights to use the application, then, the user may launch 455 the host program and the host program can immediately begin providing the desired features. In either event, the host program activates 460 the application. The application then provides 475 the basic features to the host program. For example, the application may operate correctly if the host provides a "table" function, but will not be able to provide the full visual effects unless the host program provides a "color chart" function or a "text formatting" function. At operation 480, if there are any optional features of the application that are supported by the host program then the application 485 also provides those supported optional features to the host program. If there are no optional functions supported by the host program then the application continues to operate in the basic features mode.

Once the manifest has been downloaded and stored on the user's computer then, at a later time, when the user activates 455 the host program, the host program can directly call 460 the application, rather than operations 412-450 having to be repeated.

It will be appreciated that some applications might be free and can then be immediately downloaded, some applications might only be for sale and so a "buy" or "acquire" transaction might have to be executed, and some applications might be free but require that the user provide certain information to register the product, such as name, location, email address, etc.

Once the application is operating within or in conjunction with the host program, the application may, however, be operating in a limited function mode, or with certain features or capabilities disabled, as some other functions may be needed in order to obtain the full use of the application. For example, the application may run if a "table" function is provided, but will not be able to provide the full visual effects of the program until a "color chart" function or a "text formatting" function is provided. If there are no optional functions available from a host program on the client computer then the application continues to support the host program in the reduced functionality mode. If, however, one or more optional functions is available from a host program then the application will allow the host program to operate in an enhanced mode, depending upon the types of optional functions that are available.

The set of functions is preferably defined with some particularity. For example, a "table" function may be defined as providing support for a tabular structure, rows, columns, heading, and a sort feature. As another example, a "text formatting" function may be defined as providing support for the ability to select various fonts, font sizes, underlining, bolding, etc. As another example, a "color chart" function may be defined as providing support for the ability to select different chart styles, different colors for different areas in the charts, axis information (e.g., date, price, sales, change, order backlog), etc.

Thus, rather than having to specify a particular host program, or a particular version of a particular host program, or a particular host platform, the developer of an application can simply specify the functions that are required, and the functions that are optional. Also, each host program provides a list of functions that are available. Thus, when it is desired to obtain or run an application, the manifest of the application is compared with the function capabilities of the host program(s) on the client computer. If there is a match, the application can be listed, downloaded, and run, at least in a basic mode. Also, if the manifest of the application lists optional functions, and the host programs provide one or more optional functions, then the application can run in an enhanced mode.

It is possible that the client computer 10 will have or have access to two or more host programs, and that a particular function may be provided by two or more host programs. One host program may, however, provide enhancements to that function whereas another host program does not. If those enhancements are usable by the application then, preferably, the enhanced function would be used. Accordingly, optional enhancements to a function may be listed. For example, the "table" function, in addition to providing the specified, required features, may also list other features that are available (host program) or desired (downloaded application). As an example, the "table" function may list "page separator" (e.g., the ability to break a spreadsheet into two or more pages at user-specified points) or "page printing order" (e.g., the ability to specify whether the pages in a multi-page spreadsheet or printed from top to bottom, and then left to right, or are printed from left to right, and then top to bottom). Thus, the manifest could specify: "Table: page separator" or "Table: page printing order", or "Table: page separator; page printing order".)

It is also possible, where a particular function may be provided by two or more host programs, that the function provided by one host program may be more desirable in some respect, such as being more robust or operating more quickly, or that the function provided by another host program may be less desirable in some respect, such as using excessive processor memory or time. Therefore, a function may also specify a preferred host program so that the best performance may be obtained for the application. For example, the manifest could specify: "Table: Excel®". Thus, if two host programs can provide the table function, then Excel® will be selected to provide the table function. If, however, there is a host program that can provide the table function then the downloaded application will still operate, even if Excel® is not available as a host program on the client computer.

A function could also specify that it must be provided by a particular host program. For example, the manifest could specify: "Table: Required: Excel®". This option is not as preferred, however, because this option limits the application to known host programs and does not provide for future host programs unless the manifest is later updated.

A function may also specify that the function from a particular host program is not to be used, even if it is a required function. For example, the manifest could specify: "Table: Not NNN" (where "NNN" is the name or other identification of the program which should not to be used to provide that function). In that case, if "NNN" was the only host program which could provide the Table function, then the application would not show up as a downloadable application.

Similarly, a function could also specify that it must be provided by a host program on a particular platform. For example, For example, the manifest could specify: "Table: Required Platform: Kindle®". This option is not as preferred, however, because this option limits the application to known platforms and does not provide for future platforms unless the manifest is later updated.

Also, a function can be tied to a particular version of a host program. For example, the manifest could specify: "Table: YYYv2.5", where "YYY" is the name of the host program. This option is not as preferred, however, because this option limits the application to that version of that host program and does not provide for future versions or programs unless the manifest is later updated.

Also, a function can be tied to a particular version or later of a host program. For example, For example, the manifest could specify: "Table: YYYv2.5+", where "YYY" is the name of the host program, and the "+" indicates that version 2.5 or later will work. Conversely, the manifest could specify: "Table: YYYv2.5-", where "YYY" is the name of the host program, and the "−" indicates that version 2.5 or earlier will work. This option is not as preferred, however, because this option limits the application to that version (or earlier, or later) of that host program. It may, however, be desirable to tie functions to particular platforms or earlier versions of host programs in certain cases, such as when it is desired to provide an application intended for a legacy device or legacy programs.

In an alternative embodiment, the client computer 10 sends, to the server 14, a listing of host programs available on the client computer when the client computer 10 requests a list of applications available for download from the server 14. The server 14 would then compare the functions provided by the host programs on the client computer with the required functions for each application to determine the applications which will operate properly on the client computer. The server 14 would then send the client computer 10 a list of those usable applications, and the client computer would display the list of those usable applications to the user for selection and downloading.

Figure 5:
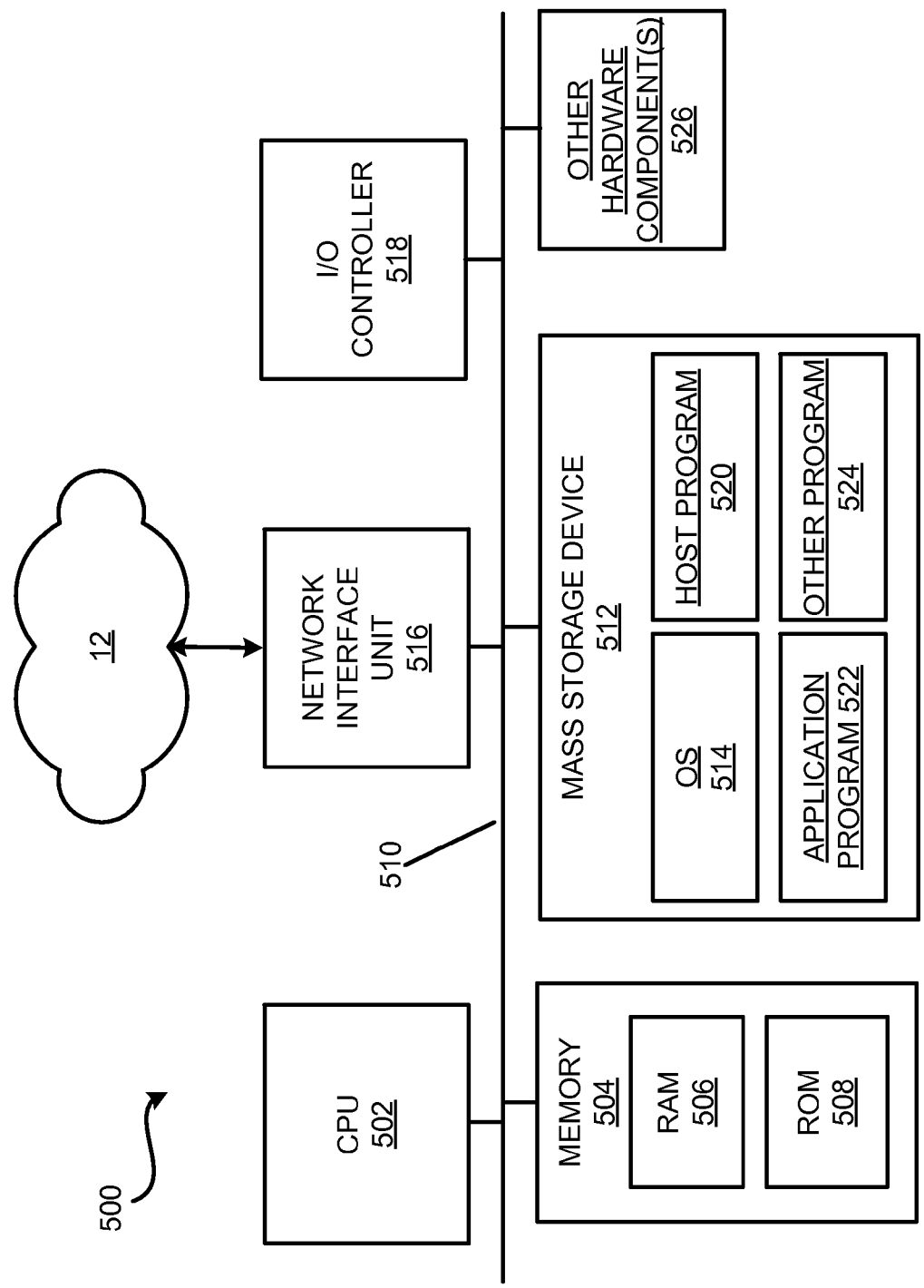
FIG. 5 illustrates exemplary computer architecture for devices capable of executing the procedures described herein.

FIG. 5 illustrates exemplary computer architecture 500 for a device capable of executing the procedures described herein for a server 14 or for a client computer 10. Thus, the computer architecture 500 illustrates an exemplary architecture for a server computer, mobile phone, a PDA, a smart phone, a desktop computer, a netbook computer, a tablet computer, and/or a laptop computer. The computer architecture 500 may be utilized to execute any aspects of the software operations presented herein.

The exemplary computer architecture 500 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 514 and one or more host programs 520, one or more application programs 522, and one or more other programs 524.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

The list of downloadable software applications, the list of required functions for each software application, a downloadable software application, and the optional functions for each software application may be sent by the processor 502 retrieving these items from the mass storage device 512 and then sending these items via the network interface unit 516, by causing the mass storage device 512 to send these items directly to the network interface unit 516 instead of to the processor 502, or a combination of both, whereby some items are sent directly from the mass storage device 512 to the network interface unit 516, and other items are sent from the processor 502 to the network interface unit 516.

Although the memory 504 and mass storage device 512 are preferably separate components, the memory 504 could be included in a mass storage device 512. The memory 504 and mass storage device 512 may be collectively considered to be, and referred to as, a memory device.

Other hardware components 526 may also be present. For example, component 526 may be a sensor component, such as a magnetometer, an ambient light sensor, a proximity sensor, an accelerometer, a gyroscope, a global positioning system (GPS) sensor, a microphone or other audio input device, a camera, etc. Indeed, the application being sought by the user may be for use with one of those other hardware components.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium" and variations thereof, does not include waves, signals, and/or other transitory and/or intangible communication media, per se.

According to various embodiments, the computer architecture 500 may operate in a networked environment using logical connections to remote computers and/or servers through a network such as the network 12. The computer architecture 500 may connect to the network 12 through a network interface unit 516 connected to the bus 510. It should be appreciated that the network interface unit 516 also may be utilized to connect to other types of networks and remote computer systems. The computer architecture 500 also may include an input/output controller 518 for receiving and processing input from a number of other devices, including a keyboard, mouse, touchscreen, touchpad, keypad, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. The CPU 502 may be a single processor, or may be a plurality of processors. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture in order to store and execute the software components presented herein. It also should be appreciated that the computer architecture may include other types of computing devices, including hand-held computers, embedded computer systems, personal digital assistants, and other types of computing devices known to those skilled in the art. It is also contemplated that the computer architecture may not include all of the components shown herein, may include other components that are not explicitly shown herein, or may utilize an architecture completely different than that shown herein.

The subject matter described above is provided by way of illustration only and should not be construed as limiting. Various modifications and changes may be made to the subject matter described herein without following the exemplary embodiments and applications illustrated and described herein.

Although the subject matter presented herein has been described in language specific to computer structural features, methodological and transformative acts, specific computing machinery, and computer readable media, it is to be understood that the appended claims are not necessarily limited to the specific features, acts, or media described herein. Rather, the specific features, acts and mediums are disclosed as example forms of implementing the claims.

The invention claimed is:

1. A method of operation of a client computer, whereby an application is obtained from a server for use with a host program on the client computer, the method comprising:
   determining functions provided by the host program on the client computer;
   sending an application search request and a list of the determined functions to the server, the list of the determined functions not being a list of programs or a list of applications;
   receiving a list of applications available from the server which can be used, at least in a basic mode of operation, with one or more of the determined functions
   presenting the list of applications;
   receiving, from a user, a selection of an application from the list;
   sending the selection to the server;
   receiving the selected application; and
   activating the received application using the host program.

2. The method of claim 1, and further comprising:
   determining, by the client computer, whether the received application has an optional feature;
   if the received application has an optional feature then determining, by the client computer, an optional function to support the optional feature;
   determining, by the client computer, whether the optional function is in the list of the determined functions; and
   if the optional function is in the list of determined functions then activating, at the client computer, that optional feature.

3. The method of claim 2, wherein the basic mode of operation of the received application does not provide for color in an output, and the optional feature of the received application provides for color in the output.

4. The method of claim 1 wherein the selected application has a basic mode of operation providing certain features and an enhanced mode of operation providing optional features, and further comprising receiving, by the client computer, a manifest for the selected application, the manifest containing at least a list of functions required for the selected application to operate in the basic mode of operation, the list of the functions required not being a list of programs or a list of applications, and wherein the host program of the client computer activates the received application in at least the basic mode of operation.

5. The method of claim 4, wherein the manifest specifies that a particular host program is not to be used to provide a specified function.

6. The method of claim 1 and further comprising, after receiving the selected application, the host program of the client computer activates the selected application when the host program is activated.

7. A server having downloadable software applications thereon, the server comprising:
   a memory device containing operating instructions, a list of downloadable software applications, and, for each of the downloadable software applications, a list of functions required for the downloadable software application to be used in a basic mode of operation, the list of functions required not being a list of programs or a list of applications;
   a network interface unit;
   a processor, communicatively coupled to the memory device and to the network interface unit, the processor of the server executing the operating instructions to:
      receive, via the network interface unit, from a client computer, a request for a list of software applications which are available on the server, and a list of functions provided by a host program on the client computer, the list of functions provided not being a list of programs or a list of applications;
      identify software applications which can be used, at least in a basic mode of operation, with one or more of the functions provided by the host program;
      generate a list of the identified software applications;
      cause the list of identified software applications to be sent via the network interface unit to the client computer;
      receive, via the network interface unit, from the client computer, a request for a selected one of the identified software applications;
      cause the selected software application to be sent via the network interface unit to the client computer.

8. The server of claim 7 wherein the processor further executes the operating instructions to:
   retrieve from the memory device a list of functions optionally usable by each software application of the identified software applications, the list of the functions optionally usable not being a list of programs or a list of applications; and
   cause the list of the functions optionally usable by each software application of the identified software applications to be sent via the network interface unit to the client computer.

9. The server of claim 7 wherein the processor further executes the operating instructions to:
   retrieve from the memory device a list of functions optionally usable by each software application of the identified software applications, the list of the functions optionally usable not being a list of programs or a list of applications; and
   cause the list of the functions optionally usable along with the list of software applications and the list of functions required by each of the software applications of the identified software applications to be sent via the network interface unit to the client computer.

10. The server of claim 7 wherein the processor further executes the operating instructions to:
    retrieve from the memory device a list of functions optionally usable by the selected software application, the list of the functions optionally usable not being a list of programs or a list of applications; and
    cause the list of the functions optionally usable by the selected software application to be sent via the network interface unit to the client computer.

11. The server of claim 7 wherein the processor further executes the operating instructions to:
    retrieve from the memory device a list of functions optionally usable by the selected software application, the list of the functions optionally usable not being a list of programs or a list of applications; and
    cause the list of the functions optionally usable by the selected software application along with the selected software application to be sent via the network interface unit to the client computer.

12. A computer storage medium having computer readable instructions stored thereupon to obtain an application from a server for use with a host program on a client computer, the computer readable instructions, when executed by the client computer, cause the client computer to:
- determine, by the client computer, functions provided by the host program on the client computer;
- send an application search request and a list of the determined functions to the server, the list of the determined functions not being a list of programs or a list of applications;
- receive a list of applications available from the server which can be used, at least in a basic mode of operation, with one or more of the determined functions;
- present, by the client computer, the list of applications to a user;
- receive, by the client computer, from the user, a selection of an application from the list;
- send the selection to the server;
- receive the selected application from the server; and
- activate, at the client computer, the received application using the host program.

13. The computer storage medium of claim 12, further comprising computer readable instructions that, when executed by the client computer, cause the client computer to:
- accept a request to download a selected one of the software applications on the list of applications;
- request a download of the selected software application from the server;
- accept the download of the requested software application from the server.

14. The computer storage medium of claim 12, further comprising computer readable instructions that, when executed by the client computer, cause the client computer to receive, from the server, a list of features optionally usable with the host program, the list of the features optionally usable not being a list of programs or a list of applications.

15. The computer storage medium of claim 12, further comprising computer readable instructions that, when executed by the client computer, cause the client computer to activate an optional feature of the selected software application on the client computer if the host program provides a function which supports the optional feature.

16. The computer storage medium of claim 15, wherein the basic mode of operation of the selected software application does not provide for color in an output, and the optional feature of the selected software application provides for color in the output.

17. The computer storage medium of claim 12, further comprising computer readable instructions that, when executed by the client computer, cause the client computer to receive a manifest from the server for at least the selected software application, wherein the selected software application has a basic mode of operation providing certain features and an enhanced mode of operation providing optional features, the manifest containing at least a list of functions required for the selected software application to operate in the basic mode of operation, the list of the functions required not being a list of programs or a list of applications.

18. The computer storage medium of claim 17, wherein the manifest specifies that a particular host program is not to be used to provide a specified function.

19. The computer storage medium of claim 12, further comprising computer readable instructions that, when executed by the client computer, cause the client computer, after receiving the selected software application, to activate the selected application on the client computer using the host program on the client computer when the host program is activated.

* * * * *